US012750614B2

(12) United States Patent
Takeda et al.

(10) Patent No.: US 12,750,614 B2
(45) Date of Patent: Sep. 29, 2026

(54) LOUDSPEAKER AND LOUDSPEAKER MANUFACTURING METHOD

(71) Applicant: Panasonic Automotive Systems Co., Ltd., Kanagawa (JP)

(72) Inventors: Kengo Takeda, Osaka (JP); Akihiro Yogo, Mie (JP); Masashi Kawabe, Mie (JP); Kazuaki Nishimura, Mie (JP); Hiroto Usui, Osaka (JP)

(73) Assignee: PANASONIC AUTOMOTIVE SYSTEMS CO., LTD., Kanagawa (JP)

(*) Notice: Subject to any disclaimer, the term of this patent is extended or adjusted under 35 U.S.C. 154(b) by 148 days.

(21) Appl. No.: 18/966,724

(22) Filed: Dec. 3, 2024

(65) Prior Publication Data

US 2025/0203260 A1 Jun. 19, 2025

(30) Foreign Application Priority Data

Dec. 14, 2023 (JP) ................................ 2023-211356

(51) Int. Cl.

| | |
|---|---|
| ***H04R 1/06*** | (2006.01) |
| ***H04R 7/12*** | (2006.01) |
| ***H04R 9/02*** | (2006.01) |
| ***H04R 9/04*** | (2006.01) |
| ***H04R 9/06*** | (2006.01) |
| ***H04R 31/00*** | (2006.01) |

(52) U.S. Cl.

CPC ................ *H04R 1/06* (2013.01); *H04R 7/12* (2013.01); *H04R 9/025* (2013.01); *H04R 9/045* (2013.01); *H04R 9/06* (2013.01); *H04R 31/006* (2013.01); *H04R 2400/11* (2013.01)

(58) Field of Classification Search

CPC . H04R 1/06; H04R 7/12; H04R 9/025; H04R 9/045; H04R 9/06; H04R 31/006; H04R 2400/11

See application file for complete search history.

(56) References Cited

U.S. PATENT DOCUMENTS

| | | | | |
|---|---|---|---|---|
| 4,829,582 A * | 5/1989 | Heuvinck | H04R 31/00 381/409 |
| 5,583,944 A * | 12/1996 | Morohoshi | H04R 9/045 381/400 |
| 2020/0245072 A1 * | 7/2020 | Miyamoto | H04R 7/26 |

FOREIGN PATENT DOCUMENTS

| | | |
|---|---|---|
| JP | S58-060869 U | 4/1983 |
| JP | 2001-069593 A | 3/2001 |

* cited by examiner

*Primary Examiner* — Huyen D Le

(74) *Attorney, Agent, or Firm* — Greenblum & Bernstein, P.L.C.

(57) ABSTRACT

A loudspeaker includes: a connection wire that connects a voice coil and a connection terminal, wherein the connection terminal includes: a base; and a first protrusion and a second protrusion that integrally protrude from the base, and a deformed portion is included in at least one of a boundary portion between the base and the first protrusion or a boundary portion between the base and the second protrusion, the deformed portion being a portion that is plastically deformed in a direction in which the first protrusion and the second protrusion approach each other.

11 Claims, 7 Drawing Sheets

LOUDSPEAKER AND LOUDSPEAKER MANUFACTURING METHOD

CROSS REFERENCE TO RELATED APPLICATION

The present application is based on and claims priority of Japanese Patent Application No. 2023-211356 filed on Dec. 14, 2023.

FIELD

The present disclosure relates to a loudspeaker and a method for manufacturing the loudspeaker.

BACKGROUND

In loudspeakers, there are cases where a highly-durable, highly-flexible flexible wire is used to establish a connection between a voice coil and a terminal for establishing an external connection. Conventionally, such terminals and flexible wires are often connected by soldering. Moreover, Patent Literature (PTL) 1 describes a technique in which a terminal and a flexible wire are connected by crimping a portion of the terminal that is disposed so as to wrap around the surroundings of an end portion of the flexible wire. Patent Literature (PTL) 2 describes a technique in which a flexible wire and a terminal are connected by a spring force of the terminal by pushing the flexible wire into a slit provided on the terminal.

CITATION LIST

Patent Literature

PTL 1: Japanese Unexamined Patent Application Publication No. 2001-069593

PTL 2: Japanese Unexamined Utility Model Patent (Registration) Application Publication No. S58-060869

SUMMARY

However, the techniques described in the above-mentioned PTL 1 and PTL 2 can be improved upon.

In view of this, the present disclosure provides a loudspeaker and a method for manufacturing the loudspeaker that can further improve upon the related art.

A loudspeaker according to one aspect of the present disclosure includes: a magnetic circuit having a magnetic gap; a voice coil disposed inserted in the magnetic gap; a cone to which the voice coil is attached; a frame that holds the magnetic circuit and the cone; a connection terminal attached to the frame; and a connection wire that connects the voice coil and the connection terminal, wherein the connection terminal includes: a base; a first protrusion that integrally protrudes from the base; and a second protrusion that integrally protrudes from the base and is separated from the first protrusion by a gap, and a deformed portion is included in at least one of a boundary portion between the base and the first protrusion or a boundary portion between the base and the second protrusion, the deformed portion being a portion that is plastically deformed in a direction in which the first protrusion and the second protrusion approach each other.

Furthermore, a method for manufacturing a loudspeaker according to one aspect of the present disclosure, the loudspeaker including a magnetic circuit having a magnetic gap, a voice coil disposed inserted in the magnetic gap, a cone to which the voice coil is attached, a frame that holds the magnetic circuit and the cone, a connection terminal attached to the frame, and a connection wire that connects the voice coil and the connection terminal, the connection terminal including a base, a first protrusion that integrally protrudes from the base, and a second protrusion that integrally protrudes from the base and is separated from the first protrusion by a gap, includes: inserting the connection wire in the gap between the first protrusion and the second protrusion, the connection wire being disposed to intersect with an arrangement direction of the first protrusion and the second protrusion; and pressure bonding the connection wire by crimping the connection terminal to cause a projecting end portion of the first protrusion and a projecting end portion of the second protrusion to approach each other.

The present disclosure can further improve upon the related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Hereinafter, an embodiment of a loudspeaker and a method for manufacturing the loudspeaker according to the present disclosure will be described with reference to the drawings. It should be noted that the following embodiment is merely an example for describing the present disclosure, and is not intended to limit the scope of the present disclosure. For example, the shapes, structures, materials, elements, relative positional relationships, connection states, numerical values, formulas, and details of each of the steps and the order of the steps of the methods, and the like, described in the following embodiment are mere examples, and may include details that are not included in the following descriptions. Furthermore, although geometric expressions, such as "parallel" and "orthogonal", may be used, these expressions are not mathematically precise indications and include substantially permissible error, deviation, and the like. Moreover, expressions, such as "simultaneous" and "identical (or the same)", are considered to cover a substantially permissible range of meaning.

Additionally, the drawings are schematic illustrations, which may include emphasis, omission, or adjustment of proportion as necessary for the purpose of illustrating the present disclosure, and thus the shapes, positional relationships, and proportions shown may be different from actuality. Furthermore, an X-axis, Y-axis, and Z-axis, which may be shown in the figures indicate orthogonal coordinates that have been set in an arbitrary manner for the purpose of describing the figures. That is to say, a Z-axis is not necessarily an axis that extends in a vertical direction, and X and Y axes do not necessarily lie within a horizontal plane.

Furthermore, hereinafter, multiple aspects may be comprehensively described as a single embodiment. Moreover, part of the contents in the description below describes optional elements related to the present disclosure.

Figure 1:
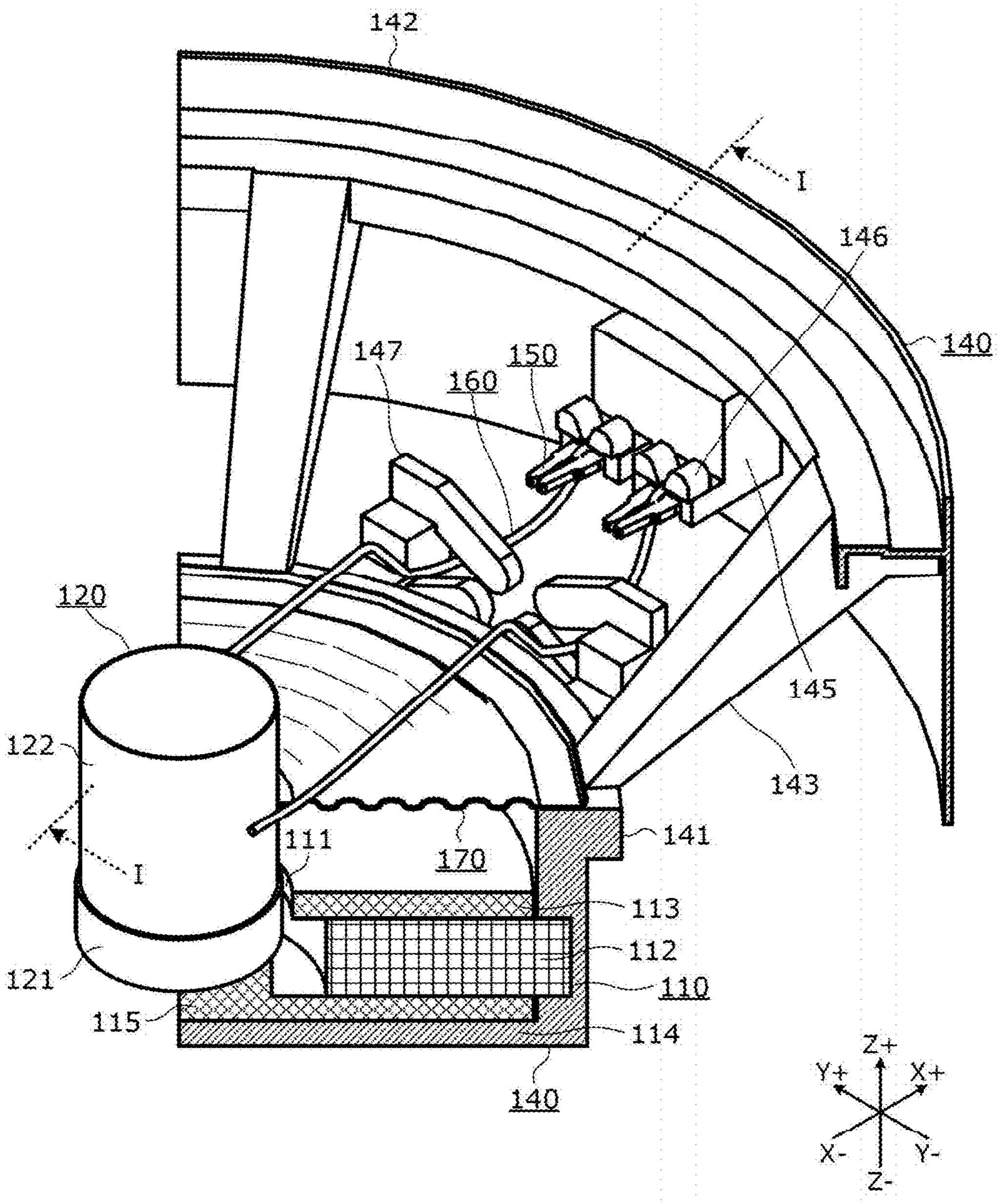
FIG. 1 is a cross-sectional perspective view of a loudspeaker according to an embodiment with a portion omitted.
Figure 2:
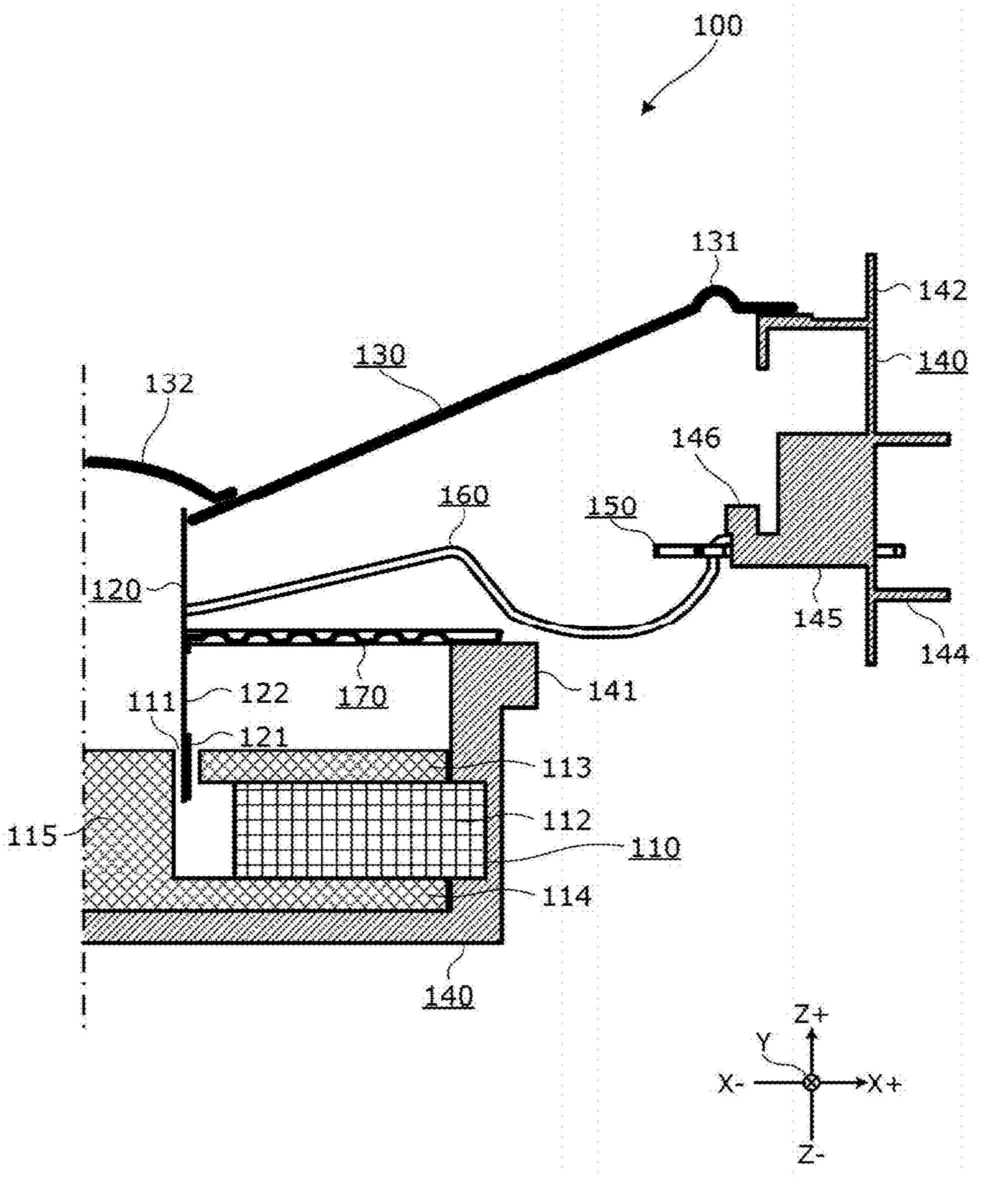
FIG. 2 is a cross-sectional view of the loudspeaker according to the embodiment.

FIG. 1 is a cross-sectional perspective view of a loudspeaker according to an embodiment with a cone omitted. FIG. 2 is a cross-sectional view of the loudspeaker according to the embodiment. It should be noted that FIG. 2 is a cross-sectional view taken along line I-I shown in FIG. 1. Furthermore, although not visible in the cross-sectional view shown in FIG. 2, a connection wire and a terminal have been added.

Loudspeaker 100 is not particularly limited as long as it converts an electric signal to audio. In the present embodiment, loudspeaker 100 is a loudspeaker attached to a mobile body, such as an automobile, and is a compact loudspeaker that can be embedded in the limited amount of space found in the mobile body. It should be noted that, in the present specification, "compact" may be used to refer to loudspeakers for which frame 140 has an inner diameter of 10 cm or less. Loudspeaker 100 includes magnetic circuit 110, voice coil 121, cone 130, frame 140, connection terminals 150, and connection wires 160.

Magnetic circuit 110 generates a constant magnetic flux. The constant magnetic flux generated by magnetic circuit 110 exerts an influence on the magnetic flux that changes based on an electric signal input to voice coil body 120. Magnetic circuit 110 is attached to frame 140 so as to be disposed behind cone 130, and includes magnetic gap 111 that is annular and faces cone 130. Magnetic gap 111 is a gap in which a constant magnetic flux is generated in a direction intersecting the magnetic flux generated by voice coil body 120.

In the present embodiment, magnetic circuit 110 is of an outer-magnet type, and includes magnet 112 that is magnetized and cylindrical, top plate 113 that is annular and disposed on a surface of magnet 112 closer to cone 130, base plate 114 that is disc-shaped and disposed on a side opposite of top plate 113 relative to magnet 112, and center pole 115 that is inserted in a penetrating hole of top plate 113 that extends from a central portion of base plate 114, and defines magnetic gap 111 that is between center pole 115 and top plate 113. Furthermore, base plate 114 and center pole 115 are integrally formed.

Top plate 113, base plate 114, and center pole 115 are made of magnetic materials. A magnet with high magnetic energy, such as a neodymium magnet or the like may be used as magnet 112, for example. Accordingly, the thickness of magnet 112 can be reduced, and the overall thickness of loudspeaker 100 can be reduced. Furthermore, a weight reduction can be achieved.

Magnet 112 is plate-shaped and annular, and is a permanent magnet in which a penetrating hole is provided through which center pole 115 penetrates through at a central portion. One end of magnet 112, in a thickness direction (winding-axis direction of voice coil 121), is a north pole and another end of magnet 112 is a south pole. Top plate 113 is fixed to a surface on a side of one pole of magnet 112, and base plate 114 is fixed to a surface on a side of another pole of magnet 112. Although the method for fixing top plate 113, magnet 112, and base plate 114 to each other is not particularly limited, in the present embodiment, adhesive is used for fixing. It should be noted that fastening components, such as screws, rivets, and the like may be used for fixing.

It should be noted that magnetic circuit 110 included in loudspeaker 100 is not limited to a particular type, and an inner-magnet type of magnetic circuit 110 or the like may be used.

Voice coil 121 is a component disposed in magnetic gap 111 of magnetic circuit 110, and is attached to cone 130. Voice coil 121 generates magnetic flux based on the electric signal that is input, and vibrates in the winding-axis direction due to interaction with the magnetic flux of magnetic circuit 110.

The winding axis (central axis) of voice coil 121 is disposed in the direction of vibration (amplitude) of cone 130, and is orthogonal to the direction of magnetic flux in magnetic gap 111.

Voice coil 121 is configured as a single, metal wire that is wrapped around a plurality of times in an annular manner (cylindrical shape). In the present embodiment, voice coil body 120 includes voice coil 121 and bobbin 122 to which voice coil 121 is wound around. Bobbin 122 is a cylindrical component that is made of a material, such as aluminum, resin, or the like. Voice coil 121 is connected to cone 130 via bobbin 122. Additionally, each end portion of the pair of connection wires 160, which extends from voice coil body 120 and is electrically connected to voice coil 121, is mechanically attached to a corresponding connection terminal. In the present embodiment, flexible wires are used as connection wires 160.

A flexible wire is a type of lead wire that has a structure that is flexible, yet robust to repeated bending when compared to a vinyl-insulated wire, litz wire, or the like. Since flexible wires are less prone to exerting stress on the vibration of voice coil body 120, the influence of connection wires 160 on acoustic characteristics can be inhibited. Specifically, an example can be illustrated of a flexible wire with a structure in which a large number of wires, including thread on which copper foil is wrapped around, are twisted together.

It should be noted that loudspeaker 100 need not include bobbin 122, and voice coil 121 may be directly attached to cone 130.

Furthermore, in the present embodiment, damper 170 is attached to voice coil body 120. Damper 170 includes an inner-circumferential portion that is attached to voice coil body 120 and an outer-circumferential portion that is attached to frame 140, and damper 170 is a component having flexibility and recoverability. Damper 170 is in a shape that is concentric and wave-like. Furthermore, damper 170 supports voice coil body 120 to move in a linear manner in the winding-axis direction of voice coil 121. It should be noted that a damper-less design may be used to reduce the minimum resonant frequency of loudspeaker 100 and improve sound quality. Furthermore, damper 170 may be attached to cone 130 instead of voice coil body 120.

Cone 130 is a component connected to voice coil 121, and is a component that generates sound by causing air to vibrate through displacement in the winding axis direction relative to a neutral position, based on the vibration of voice coil 121. In the present embodiment, cone 130 is cone shaped, so to speak. The outer-circumferential portion of cone 130 is attached to an end surface of a wall portion of frame 140 via edge 131, which has higher flexibility and recoverability than that achieved by the shape of cone 130. A hole is provided at a central portion of cone 130 through which bobbin 122 is provided penetrating through. Cap 132 is dome shaped and is attached to cone 130 so as to cover the hole in the central portion of cone 130.

It should be noted that the shape of cone 130 is not particularly limited, and examples of shapes include circular cones, elliptical cones, pyramids, and the shape may also be a flat shape, such as a disc, elliptical disc, plate, or the like. The material that cone 130 is made of is not particularly limited, and may, for example, be paper, resin, or the like.

Frame 140 is a component that holds magnetic circuit 110, voice coil body 120, and damper 170. In the present embodiment, frame 140 includes inner member 141 that is closed-bottomed and cylindrical and holds magnetic circuit 110 and damper 170, outer member 142 that is annular (cylindrical) and disposed in an outer periphery of cone 130, and a plurality of connecting members 143 that are rod-shaped and connect inner member 141 and outer member 142 in a bridge-like manner. Inner member 141, outer member 142, and connecting members 143 are integrally formed of resin.

Connector portion 144 that protrudes outward in a radial direction from an outer-circumferential surface is attached, as an integral body, to outer member 142. Furthermore, on a side opposite of connector portion 144 of outer member 142, terminal base 145 is attached so as to protrude inward.

The outer-circumferential portion of cone 130 is attached by adhesive or the like to one end portion (end portion toward the positive side of the Z-axis in the drawings) of outer member 142 via edge 131. Magnetic circuit 110 is attached to inner member 141 in a stored state. Outer member 142 and inner member 141 are connected by connecting members 143 in a fixed manner. Accordingly, cone 130 is disposed in a predetermined position with respect to magnetic circuit 110.

Although the material that frame 140 is made of is not particularly limited, in the present embodiment, frame 140 is a resin-molded part. Inner member 141 that is closed-bottomed and cylindrical, connector portion 144, and terminal base 145 are integrally formed of resin. Holders 146 are integrally provided on a side of terminal base 145 closer to voice coil body 120. Restrainers 147 that gently restrain movement of connection wires 160 without holding connection wires 160 in a fixed manner are integrally provided between voice coil body 120 of inner member 141 and terminal base 145. It should be noted that the pair of connection terminals 150 are attached so as to penetrate through from terminal base 145 of outer member 142 to connector portion 144 by insert molding when frame 140 is being formed.

Connector portion 144 is a portion that connects loudspeaker 100 to an amplifier or the like. In the present embodiment, connector portion 144 allows connection terminals 150 that protrude inward from connector portion 144 to be electrically connected by inserting a male connector provided on a leading end of an output cable of an amplifier. Accordingly, an audio signal output by an amplifier can be input to voice coil 121 via connection wires 160.

Figure 3:
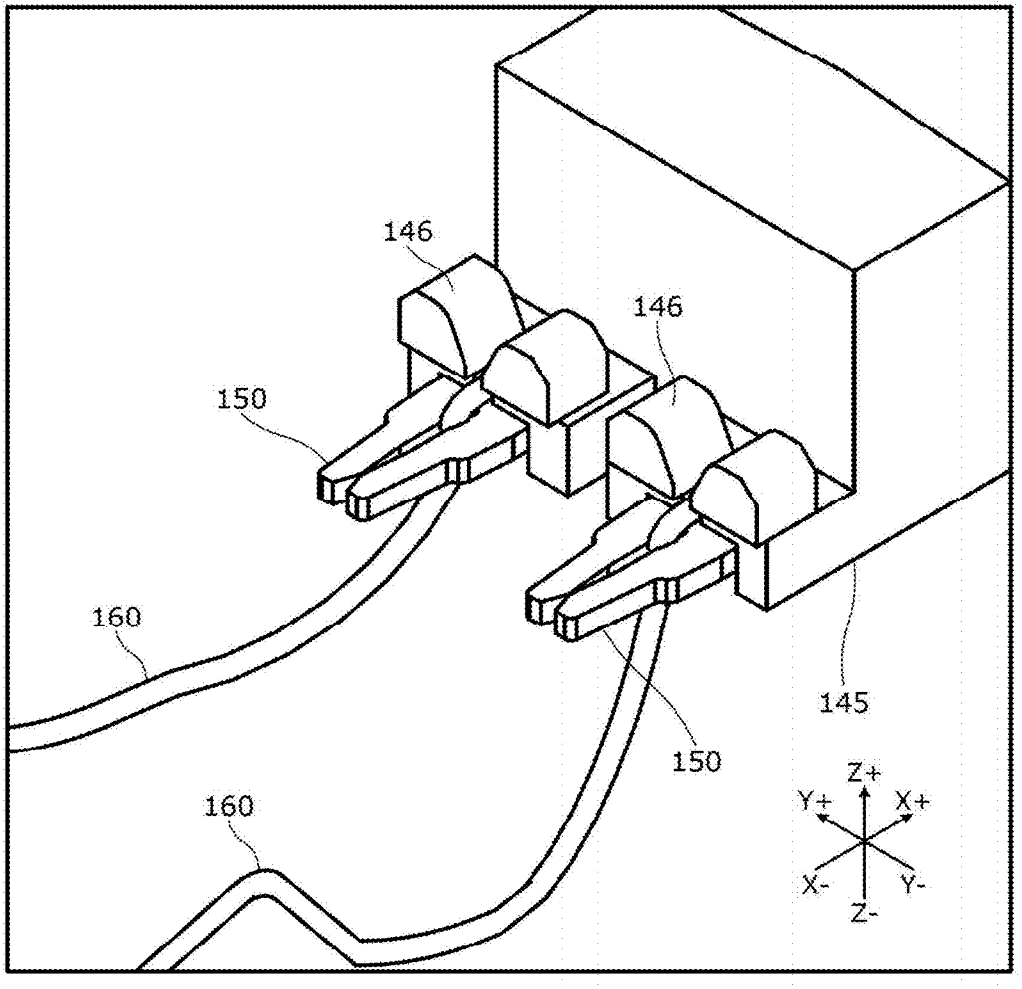
FIG. 3 is a perspective view illustrating a vicinity of a terminal base.

FIG. 3 is a perspective view illustrating a vicinity of the terminal base. As illustrated in FIG. 3, terminal base 145 holds connection terminals 150 that protrude toward a predetermined position inward of outer member 142 of frame 140. Terminal base 145 is cantilever-shaped and protrudes toward voice coil body 120 from the inner-circumferential surface of outer member 142.

A pair of holders 146 that hold the leading end portions of the pair of connection wires 160 that extend from voice coil body 120 are disposed on a side of the pair of connection terminals 150, which protrude from terminal base 145, facing toward cone 130 (positive side of Z-axis in the drawings). Holder 146 is provided with a slit, and is disposed such that the slit of holder 146 and a gap of a corresponding one of connection terminals 150 are included in the same plane.

Figure 4:
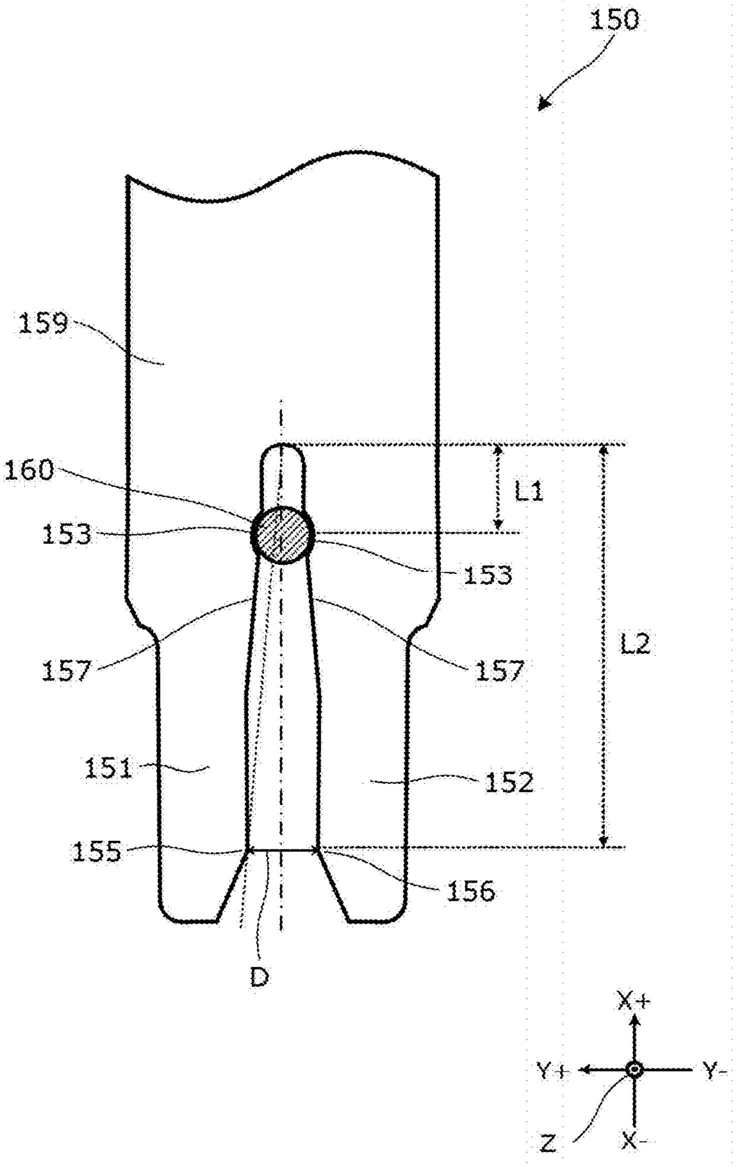
FIG. 4 is a plan view illustrating a portion of a connection terminal before plastic deformation.
Figure 5:
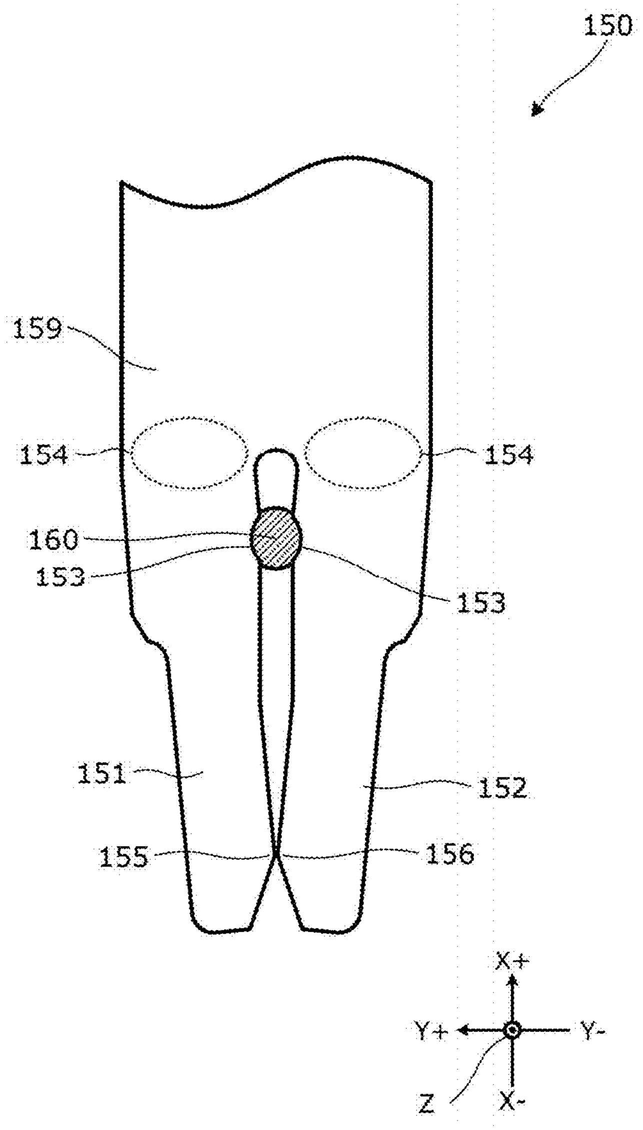
FIG. 5 is a plan view illustrating the portion of the connection terminal after plastic deformation.

FIG. 4 is a plan view illustrating connection terminal 150 before plastic deformation. FIG. 5 is a plan view illustrating connection terminal 150 after plastic deformation. Connection terminal 150 is a component that is electrically connected to connection wire 160 by structurally holding connection wire 160. Connection terminal 150 includes base 159, first protrusion 151 that integrally protrudes from base 159, and second protrusion 152 that integrally protrudes from base 159 and is separated from first protrusion 151 by a gap.

Base 159 is a portion that serves as a structural foundation that protrudes from terminal base 145, and is a portion that spans from terminal base 145 to first protrusion 151 and second protrusion 152.

Recessed portion 153 that grips and holds connection wire 160 and is recessed, in an arrangement direction (Y-axis direction in the drawings) of first protrusion 151 and second protrusion 152, in a position that is first distance L1 from base 159, in a protrusion direction (Z-axis direction in the drawings) of first protrusion 151 and second protrusion 152, is provided in at least one of first protrusion 151 or second protrusion 152 (included in both in the present embodiment). The shape of recessed portion 153 in the plan view is not limited to any particular shape. In the present embodiment, recessed portion 153 is arc shaped along the outer circumferential surface of connection wire 160. Before connection terminal 150 is crimped, the pair of recessed portions 153 that face each other and are recessed so as to recede away from each other are set at a distance such that connection wire 160 is loosely held while causing practically no deformation of connection wire 160. On the other hand, after connection terminal 150 has been crimped, the pair of recessed portions 153 are set at a distance such that connection wire 160 is tightly compressed, and connection wire 160 does not shift out of place relative to connection terminal 150 even when loudspeaker 100 is being driven. It should be noted that the shape of recessed portion 153 in the plan view may be a portion of a polygonal shape, the inside of which contacts the outer circumferential surface of connection wire 160.

Deformed portion 154, which is plastically deformed in a direction in which first protrusion 151 and second protrusion 152 approach each other, is present in at least one of the boundary portion between base 159 of connection terminal 150 and first protrusion 151 or the boundary portion between base 159 and second protrusion 152 (present in both in the present embodiment). Deformed portion 154 is a portion that is formed due to so-called crimping of connection terminal 150. In FIG. 5, although the ellipses shown by the dashed lines are used to indicate deformed portions 154, the dashed lines do not necessarily clearly indicate the positions of deformed portions 154 that are plastically deformed.

Connection terminal 150 is manufactured with first protrusion 151 and second protrusion 152 being spaced apart at a predetermined distance as illustrated in FIG. 4, and deformed portions 154 are formed by crimping being performed in a direction (Y-axis direction in the drawings) such that the distance between first protrusion 151 and second protrusion 152 is made smaller as illustrated in FIG. 5. In the present embodiment, first abutting portion 155 and second abutting portion 156, which restrict the force applied by recessed portions 153 to grip connection wire 160, are provided on first protrusion 151 and second protrusion 152, respectively, abutting each other, at a position that is second distance L2 (see FIG. 4), which is longer than first distance L1, from base 159, in the protrusion direction (toward the negative side of the X-axis in the drawings). When connection terminal 150 is crimped, no portions, in first protrusion 151 and second protrusion 152, other than first abutting portion 155 and second abutting portion 156 come into contact with each other. Accordingly, by allowing crimping work to be completed with first abutting portion 155 and second abutting portion 156 abutting each other when connection terminal 150 is crimped, it is possible to maintain a constant compression amount (length) of connection wire 160 even when crimping is performed for a plurality of connection terminals 150. Note that at the stage when the shape of connection terminal 150 is being designed, compression amount (length) T of connection wire 160 can be easily derived by using the equation T=D×(L1/L2), where D is the distance between first abutting portion 155 and second abutting portion 156 before crimping is performed ("x" indicates multiplication and "/" indicates division). Furthermore, although the compression amount of connection wire 160 is not particularly limited, an example includes a case where connection wire 160 is held by connection terminal 150 in a state where connection wire 160 is compressed within a range of from percent to less than 40 percent of the wire diameter, in the pair of recessed portions 153, by first abutting portion 155 and second abutting portion 156 abutting each other, for example.

At least one of portions facing each other in first protrusion 151 or second protrusion 152 includes tapered portion 157 (provided in both in the present embodiment) in which the gap widens from the position at which recessed portion 153 is provided toward a leading end (end portion toward negative side of X-axis in the drawings) of the at least one of first protrusion 151 or second protrusion 152. The distance between the end portions of tapered portions 157 located toward base 159 is set at a distance that is shorter than the diameter of connection wire 160. By providing tapered portions 157, upon connection wire 160 being inserted between the leading end of first protrusion 151 and the leading end of second protrusion 152, and then being moved between first protrusion 151 and second protrusion 152 toward recessed portions 153, first protrusion 151 and second protrusion 152 gradually get pressed apart due to the elasticity of connection terminal 150, and by passing over the end portions of tapered portions 157 located toward base 159, connection wire 160 becomes temporarily fixed in place by recessed portions 153.

There are no particular limitations on the material of connection terminal 150 as long as the material is conductive and can be plastically deformed. In the present embodiment, connection terminal 150 is made of metal. Furthermore, connection terminal 150 is manufactured by press working performed by punching sheet metal that includes a plane that spreads out in the protrusion direction and the arrangement direction of first protrusion 151 and second protrusion 152.

Next, a method for manufacturing loudspeaker 100 in which connection wires 160 are mechanically and electrically connected to connection terminals 150 will be described with reference to FIG. 6, FIG. 7, and FIG. 3.

Figure 6:
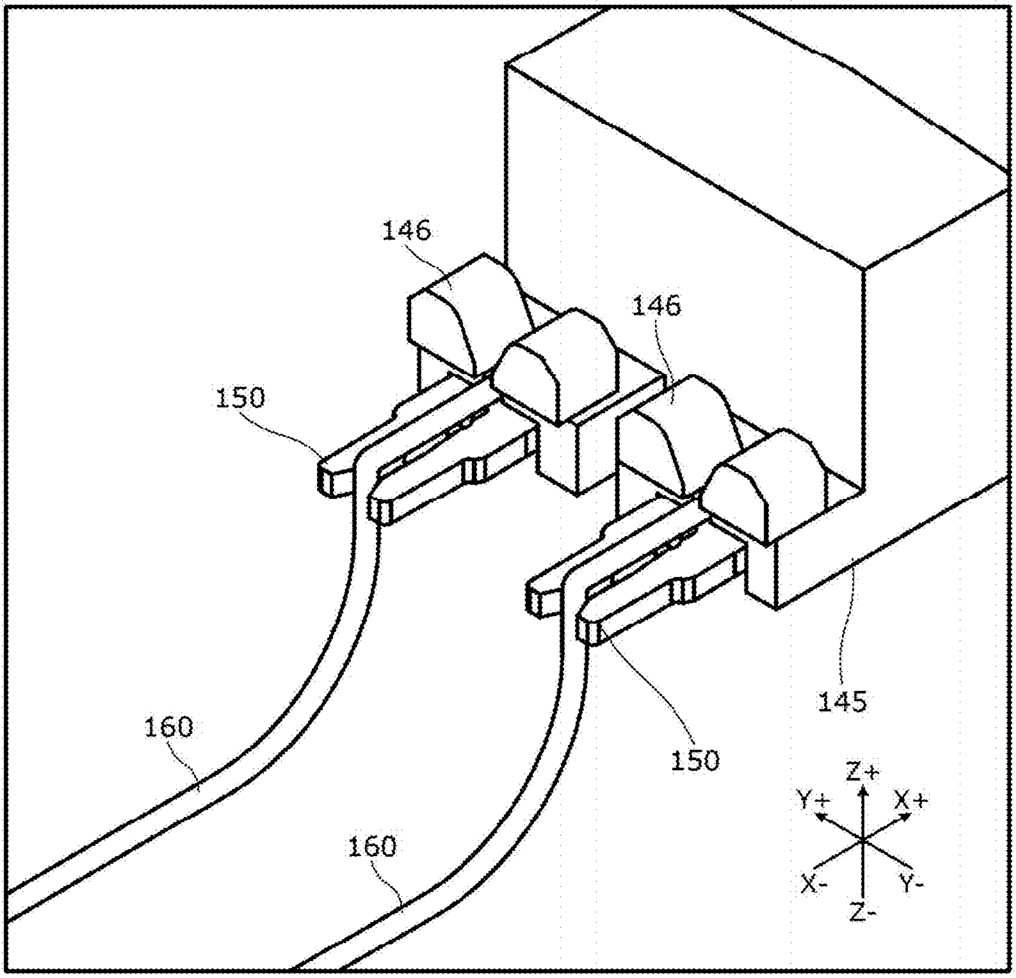
FIG. 6 is a perspective view illustrating a state in which end portions of connection wires are held by holders.

First, as illustrated in FIG. 6, a leading end portion of each of the pair of connection wires 160 that extend from voice coil 121, pass through a corresponding restrainer 147, and extend toward outer member 142, is sandwiched inside of a slit of a corresponding one of the pair of holders 146, and held by the corresponding holder 146. Next, the outer circumference of connection wire 160 is disposed between the leading end of first protrusion 151 and the leading end of second protrusion 152. Note that in the present embodiment, since the slit of holder 146 is disposed so as to be included in the same plane as the gap of a corresponding connection terminal 150, connection wires 160 can be arranged as illustrated in FIG. 6 at a stage when holders 146 are holding connection wires 160.

Figure 7:
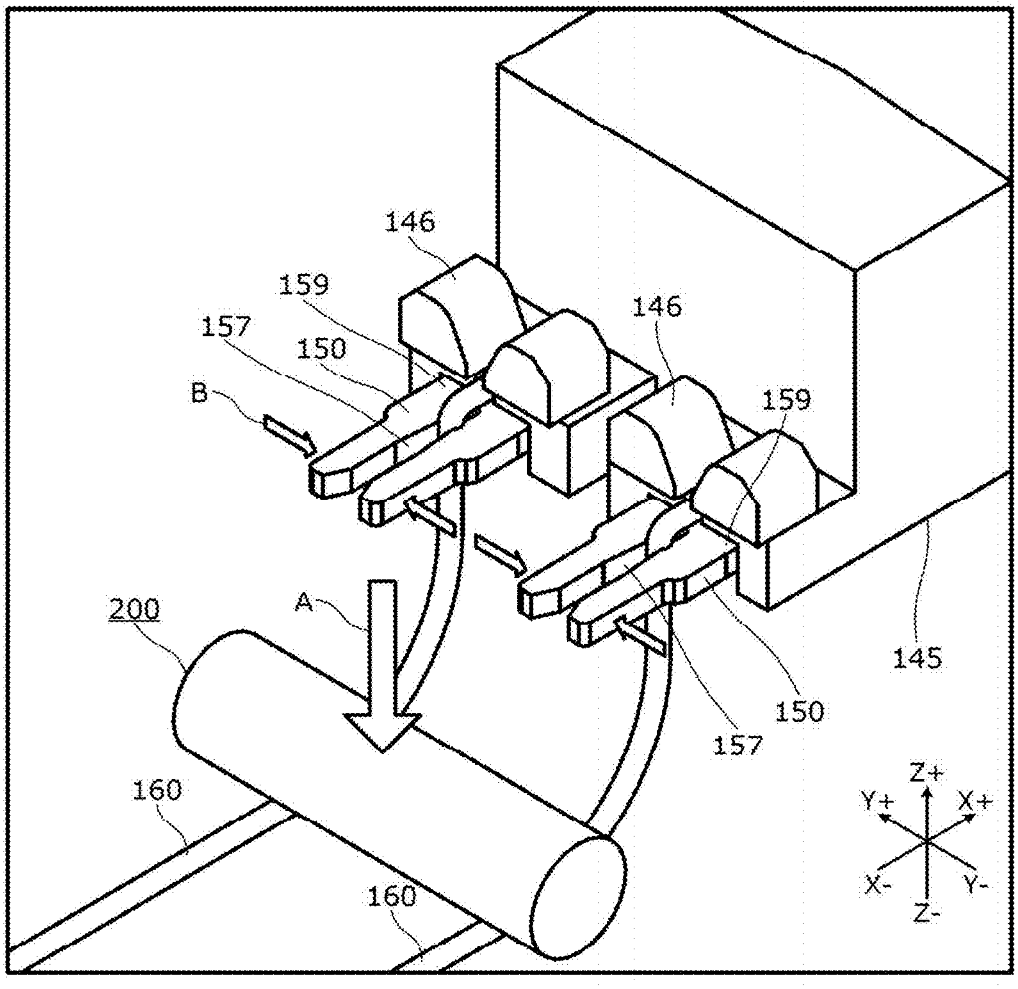
FIG. 7 is a perspective view illustrating a state in which the connection wires are temporarily fixed to connection terminals.

Next, as illustrated in FIG. 7, jig 200, a robot arm, or the like is used to individually (or simultaneously) push the pair of connection wires 160, which are provided so as to span between connection terminals 150 and restrainers 147, downward (direction of arrow A in FIG. 7, and side opposite of holders 146 with respect to connection terminals 150). Accordingly, the outer circumferential surface of connection wire 160 moves between first protrusion 151 and second protrusion 152 of connection terminal 150 toward base 159, passes through the narrowest portion of the pair of tapered portions 157, and becomes engaged in recessed portions 153. Accordingly, connection wire 160 is temporarily fixed in place by connection terminal 150.

Next, first protrusion 151 and second protrusion 152 of connection terminal 150 are crimped, in the direction indicated by arrow B illustrated in FIG. 7, until first abutting portion 155 and second abutting portion 156 are abutting each other. Accordingly, as illustrated in FIG. 3, connection wire 160 is mechanically held by the connection terminal in a compressed state, between the pair of recessed portions 153, and an electrical connection is ensured between connection wire 160 and connection terminal 150. Furthermore, deformed portions 154 that are plastically deformed are formed in the boundary portion of base 159 and first protrusion 151 and the boundary portion of base 159 and second protrusion 152.

The above-mentioned method for mechanically and electrically connecting connection wires 160 to connection terminals 150 can be automatically and readily implemented by using a robot or the like.

It should be noted that the present disclosure is not limited to the above embodiment. For example, other embodiments produced by arbitrarily combining or omitting some elements described in the present specification may be included as embodiments of the present disclosure. Moreover, so long as they do not depart from the essence of the present disclosure, that is to say, so long as they do not depart from the intended meaning of the appended claims, variations conceivable by those skilled in the art resulting from modifying the above embodiment are included in the present disclosure.

For example, although an example is described in which a pair of connection wires 160 and a pair of connection terminals 150 are simultaneously connected to each other using jig 200, each connection wire 160 may be connected to each connection terminal 150 one at a time.

Furthermore, although an example is described where an end portion of connection wire 160 is held by holder 146, after which connection wire 160 and connection terminal 150 are connected to each other, connection wire 160 and connection terminal 150 may be connected to each other in a state where the end portion of connection wire 160 is held by a second jig. In other words, loudspeaker 100 need not include holder 146.

Furthermore, connection terminal 150 and connection wire 160 are not limited to being connected to each other with the connection terminal already attached to frame 140, and connection terminal 150 may be attached to frame 140 after connection wire 160 and connection terminal 150 have been connected to each other.

Furthermore, although an example is described in which loudspeaker 100 includes damper 170, loudspeaker 100 need not include damper 170.

Furthermore, in the present embodiment, although an example was described in which connection terminal 150 includes recessed portions 153, connection terminal 150 need not include recessed portions 153.

Furthermore, in the present embodiment, although an example was described in which connection terminal 150 includes tapered portions 157, in the connection terminal, at least one of a surface of first protrusion 151 or a surface of second protrusion 152, which face each other, may be curved. "Curved" refers not only to plate shapes that include a radius shape, but to three-dimensional shapes that include a radius shape as well. Accordingly, robustness of the connection state can be improved, and furthermore, productivity of an automated connection process for connecting connection wires 160 and connection terminals 150 can be improved.

SUMMARY

Loudspeaker 100 according to a first aspect of the present disclosure includes: magnetic circuit 110 having magnetic gap 111; voice coil 121 disposed inserted in magnetic gap 111; cone 130 to which voice coil 121 is attached; frame 140 that holds magnetic circuit 110 and cone 130; connection terminal 150 attached to frame 140; and connection wire 160 that connects voice coil 121 and connection terminal 150, wherein connection terminal 150 includes: base 159; first protrusion 151 that integrally protrudes from base 159; and second protrusion 152 that integrally protrudes from base 159 and is separated from first protrusion 151 by a gap, and deformed portion 154 is included in at least one of a boundary portion between base 159 and first protrusion 151 or a boundary portion between base 159 and second protrusion 152, deformed portion 154 being a portion that is plastically deformed in a direction in which first protrusion 151 and second protrusion 152 approach each other.

According to the first aspect, connection wire 160 that is a flexible wire or the like extending from voice coil body 120 can easily be connected to connection terminal 150.

Loudspeaker 100 according to a second aspect is loudspeaker 100 according to the first aspect, wherein in connection terminal 150, at least one of first protrusion 151 or second protrusion 152 includes recessed portion 153 that grips and holds connection wire 160, recessed portion 153 being recessed in an arrangement direction of first protrusion 151 and second protrusion 152, at a position that is first distance L1 from base 159, in a protrusion direction of first protrusion 151 and second protrusion 152.

According to the second aspect, connection wire 160 can be temporarily held in recessed portion 153, and connection wire 160 and connection terminal 150 can be easily connected. "Temporarily held" includes cases where connection wire 160 is held in a state in which connection wire 160 is compressed to a certain extent, and cases where connection wire 160 is held not by compression, but by friction or the like.

Loudspeaker 100 according to a third aspect is loudspeaker 100 according to the second aspect, wherein first protrusion 151 and second protrusion 152 respectively include first abutting portion 155 and second abutting portion 156 that abut each other at a position that is second distance L2 from base 159, in the protrusion direction, and restrict force with which connection wire 160 is gripped by recessed portion 153, second distance L2 being longer than first distance L1.

According to the third aspect, by crimping connection terminal 150, force applied to connection wire 160 can be maintained within a predetermined range. Accordingly, loudspeaker 100 that exhibits a predetermined degree of performance can be produced in a stable manner.

Loudspeaker 100 according to a fourth aspect is loudspeaker 100 according to the third aspect, wherein connection wire 160 is held in connection terminal 150, in recessed portion 153 in a compressed state, by first abutting portion 155 and second abutting portion 156 abutting each other.

According to the fourth aspect, a desired robustness of connection between connection wire 160 and connection terminal 150, and a desired degree of electrical conductivity can be ensured.

Loudspeaker 100 according to a fifth aspect is loudspeaker 100 according to any one of the first to third aspects, wherein at least one of first protrusion 151 or second protrusion 152 includes tapered portion 157 in which the gap widens from a position at which recessed portion 153 is provided toward a leading end.

According to the fifth aspect, when temporarily fixing connection wire 160 to connection terminal 150, connection wire 160 can be moved while pressing apart first protrusion 151 and second protrusion 152 to widen the gap, and connection wire 160 can be disposed between the pair of recessed portions 153.

Loudspeaker 100 according to a sixth aspect is loudspeaker 100 according to the first aspect or the second aspect, wherein at least one of a surface of first protrusion 151 or a surface of second protrusion 152 is curved, the surface of first protrusion 151 and the surface of second protrusion 152 facing each other.

According to the sixth aspect, robustness of the connection state can be improved, and furthermore, productivity of an automated connection process for connecting connection wire 160 and connection terminal 150 can be improved.

Loudspeaker 100 according to a seventh aspect is loudspeaker 100 according to any one of the first to sixth aspects, wherein connection terminal 150 is in a board shape widening out in a plane that includes the protrusion direction and the arrangement direction.

According to the seventh aspect, connection terminal 150 can be easily and cost-effectively manufactured.

Loudspeaker 100 according to an eighth aspect is loudspeaker 100 according to any one of the first to seventh aspects, wherein frame 140 includes holder 146 that holds one end portion of connection wire 160 held by connection terminal 150.

According to the eighth aspect, by allowing holder 146 to first hold an end portion of connection wire 160, connection wire 160 can be easily temporarily fixed to connection terminal 150. In particular, this feature is useful when automatically connecting connection wire 160 and connection terminal 150 by a robot or the like.

Loudspeaker 100 according to a ninth aspect is loudspeaker 100 according to any one of the first to eighth aspects, wherein frame 140 includes restrainer 147 that gently restrains an other end portion of connection wire 160, the other end portion being located closer to voice coil 121.

According to the ninth aspect, vibration of connection wires 160 when loudspeaker 100 is being driven can be limited to within a predetermined range, thus inhibiting the influence of such vibration on the characteristics of loudspeaker 100.

Loudspeaker 100 according to a tenth aspect is loudspeaker 100 according to any one of the first to ninth aspects, wherein connection wire 160 is a flexible wire or a tinsel wire.

A method for manufacturing a loudspeaker according to an eleventh aspect is a method for manufacturing loudspeaker 100 that includes magnetic circuit 110 having magnetic gap 111, voice coil 121 disposed inserted in magnetic gap 111, cone 130 to which voice coil 121 is attached, frame 140 that holds magnetic circuit 110 and cone 130, connection terminal 150 attached to frame 140, and connection wire 160 that connects voice coil 121 and connection terminal 150, connection terminal 150 including base 159, first protrusion 151 that integrally protrudes from base 159, and second protrusion 152 that integrally protrudes from base 159 and is separated from first protrusion 151 by a gap, wherein at least one of first protrusion 151 or second protrusion 152 includes recessed portion 153 that grips and holds connection wire 160, recessed portion 153 being recessed in an arrangement direction of first protrusion 151 and second protrusion 152, at a position that is first distance L1 from base 159, in a protrusion direction of first protrusion 151 and second protrusion 152, and the method includes: inserting connection wire 160 in the gap between first protrusion 151 and second protrusion 152, connection wire 160 being disposed to intersect with the arrangement direction; and temporarily holding connection wire 160 in recessed portion 153, and pressure bonding connection wire 160 in recessed portion 153 by crimping connection terminal 150 to cause a projecting end portion of first protrusion 151 and a projecting end portion of second protrusion 152 to approach each other.

According to the eleventh aspect, connection wire 160, which is a flexible wire or the like that extends from voice coil body 120, and connection terminal 150 can be easily connected.

While an embodiment has been described herein above, it is to be appreciated that various changes in form and detail may be made without departing from the spirit and scope of the present disclosure as presently or hereafter claimed.

Further Information about Technical Background to this Application

The disclosure of the following patent application including specification, drawings, and claims is incorporated herein by reference in its entirety: Japanese Patent Application No. 2023-211356 filed on Dec. 14, 2023.

INDUSTRIAL APPLICABILITY

The present disclosure is applicable in loudspeakers that include a voice coil, a connection terminal, and a connection terminal that introduces an acoustic signal from outside of a frame to inside of the frame, and a method for manufacturing the same.

The invention claimed is:

1. A loudspeaker comprising:
- a magnetic circuit having a magnetic gap;
- a voice coil disposed inserted in the magnetic gap;
- a cone to which the voice coil is attached;
- a frame that holds the magnetic circuit and the cone;
- a connection terminal attached to the frame; and
- a connection wire that connects the voice coil and the connection terminal, wherein
- the connection terminal includes:
  - a base;
  - a first protrusion that integrally protrudes from the base; and
  - a second protrusion that integrally protrudes from the base and is separated from the first protrusion by a gap, and
- a deformed portion is included in at least one of a boundary portion between the base and the first protrusion or a boundary portion between the base and the second protrusion, the deformed portion being a portion that is plastically deformed in a direction in which the first protrusion and the second protrusion approach each other.

2. The loudspeaker according to claim 1, wherein
at least one of the first protrusion or the second protrusion includes a recessed portion that grips and holds the connection wire, the recessed portion being recessed in an arrangement direction of the first protrusion and the second protrusion, at a position that is a first distance from the base, in a protrusion direction of the first protrusion and the second protrusion.

3. The loudspeaker according to claim 2, wherein
the first protrusion and the second protrusion respectively include a first abutting portion and a second abutting portion that abut each other at a position that is a second distance from the base, in the protrusion direction, and restrict force with which the connection wire is gripped by the recessed portion, the second distance being longer than the first distance.

4. The loudspeaker according to claim 3, wherein
the connection wire is held in the connection terminal, in the recessed portion in a compressed state, by the first abutting portion and the second abutting portion abutting each other.

5. The loudspeaker according to claim 2, wherein
at least one of the first protrusion or the second protrusion includes a tapered portion in which the gap widens from a position at which the recessed portion is provided toward a leading end.

6. The loudspeaker according to claim 1, wherein
at least one of a surface of the first protrusion or a surface of the second protrusion is curved, the surface of the first protrusion and the surface of the second protrusion facing each other.

7. The loudspeaker according to claim 1, wherein
the connection terminal is in a board shape widening out in a plane that includes a protrusion direction of the first protrusion and the second protrusion and an arrangement direction of the first protrusion and the second protrusion.

8. The loudspeaker according to claim 1, wherein
the frame includes a holder that holds one end portion of the connection wire held by the connection terminal.

9. The loudspeaker according to claim 1, wherein
the frame includes a restrainer that gently restrains an other end portion of the connection wire, the other end portion being located closer to the voice coil.

10. The loudspeaker according to claim 1, wherein
the connection wire is a flexible wire or a tinsel wire.

11. A method for manufacturing a loudspeaker that includes a magnetic circuit having a magnetic gap, a voice coil disposed inserted in the magnetic gap, a cone to which the voice coil is attached, a frame that holds the magnetic circuit and the cone, a connection terminal attached to the frame, and a connection wire that connects the voice coil and the connection terminal, the connection terminal including a base, a first protrusion that integrally protrudes from the base, and a second protrusion that integrally protrudes from the base and is separated from the first protrusion by a gap, the method comprising:

inserting the connection wire in the gap between the first protrusion and the second protrusion, the connection wire being disposed to intersect with an arrangement direction of the first protrusion and the second protrusion; and pressure bonding the connection wire by crimping the connection terminal to cause a projecting end portion of the first protrusion and a projecting end portion of the second protrusion to approach each other.

* * * * *